(12) United States Patent
Das

(10) Patent No.: US 10,044,187 B2
(45) Date of Patent: Aug. 7, 2018

(54) AC NETWORK POWER FLOW CONTROL

(71) Applicant: ABB Technology AG, Zurich (CH)

(72) Inventor: Debrup Das, Fremont, CA (US)

(73) Assignee: ABB Schweiz AG, Baden (CH)

( * ) Notice: Subject to any disclaimer, the term of this patent is extended or adjusted under 35 U.S.C. 154(b) by 469 days.

(21) Appl. No.: 14/731,925

(22) Filed: Jun. 5, 2015

(65) Prior Publication Data

US 2016/0322816 A1    Nov. 3, 2016

Related U.S. Application Data

(60) Provisional application No. 62/154,898, filed on Apr. 30, 2015.

(51) Int. Cl.
*H02J 3/06* (2006.01)
*H02J 3/18* (2006.01)

(52) U.S. Cl.
CPC ............ *H02J 3/06* (2013.01); *H02J 3/18* (2013.01); *H02J 3/1878* (2013.01); *H02J 3/1807* (2013.01); *Y02E 40/18* (2013.01); *Y02E 40/30* (2013.01)

(58) Field of Classification Search
CPC .......... H02J 3/06; H02J 3/1878; H02J 3/1807; H02J 3/18; Y02E 40/18; Y02E 40/30
See application file for complete search history.

(56) References Cited

U.S. PATENT DOCUMENTS

| | | | |
|---|---|---|---|
| 3,818,402 A | 6/1974 | Golaski et al. | |
| 5,424,626 A * | 6/1995 | Roberts | G11B 5/3116 323/206 |
| 5,461,300 A | 10/1995 | Kappenman | |
| 5,895,979 A * | 4/1999 | Kojovic | H02H 7/26 307/17 |
| 6,194,795 B1 * | 2/2001 | Muller | H02J 3/06 307/83 |
| 2003/0151482 A1 | 8/2003 | Mayfield | |
| 2006/0022783 A1 | 2/2006 | Owen | |
| 2010/0102792 A1 | 4/2010 | Dishman et al. | |
| 2014/0009986 A1 | 12/2014 | Nanut et al. | |

OTHER PUBLICATIONS

Wikipedia.org, "Transformer", retrieved from http://en.wikipedia.org/wiki/Transformer on Jan. 10, 2016.*

(Continued)

*Primary Examiner* — Ryan Johnson
(74) *Attorney, Agent, or Firm* — J. Bruce Schelkopf; Taft Stettinius & Hollister LLP

(57) ABSTRACT

A series injection device includes a power splitter coupled to two or more lines of an AC power system. The power splitter includes a coupling transformer for each phase of a single phase or polyphase AC circuit that includes the two or more lines. Each of the coupling transformers couples one of the phases of the two or more lines. The power splitter is configured to inject a first voltage of a first polarity into one or more of the two or more lines and inject a second voltage of a second polarity opposite the first polarity into at least one of the two or more lines via the same coupling transformers used to inject the first voltage. The first and the second voltages are controllable, and may or may not be independently variable.

27 Claims, 14 Drawing Sheets

(56) References Cited

OTHER PUBLICATIONS

Perez, R.C. et al., "FACTS and D-FACTS: The Operational Flexibility Demanded by the Transmission Expansion Planning Task with Increasing RES", Study Committee C1, PS2—New System Solutions and Planning Techniques, Cigre 2014, pp. 1-9.
International Search Report and Written Opinion, PCT/US2016/029524, ISA/US, ABB Technology AG, dated Aug. 5, 2016, 13 pgs.
Bonmann, Dietrich, "Phase-Shifting Transformers", International Conference Large Power Transformers, Oct. 11, 2006.
Das, Debrup, "Dynamic Control of Grid Power Flow Using Controllable Network Transformers", PhD Thesis, Georgia Institute of Technology, May 2012.
Johal, Harjeet et al., "From Power Line to Pipeline—Creating an Efficient and Sustainable Market Structure", IEEE Energy 2030 Conference, 2008.
International Search Report for PCT International Application Serial No. PCT/US2016/029524, completed Aug. 5, 2016, (13 pages).

* cited by examiner

AC NETWORK POWER FLOW CONTROL

TECHNICAL FIELD

The instant application relates to AC networks, and more particularly to power flow control for AC networks.

BACKGROUND

AC power flow is difficult and expensive to achieve. There are a variety of conventional AC power flow control solutions. Most modern power flow controllers are power electronic based. Examples of conventional power electronic based AC power flow control solutions include Back-To-Back (BTB) converters, unified power flow controllers (UPFCs), and controllable network transformers (CNTs). The basic principle for these types of devices is to use fast switching (active) converters to inject a variable voltage between sending and receiving ends of a line and hence control the power flowing through the line. Existing power flow solutions are implemented in the middle (not necessarily at mid-point) of a power line. A power flow controller in the middle of a power line controls how much power flows through the line. Alternate routes passively pick up the rest of power to be transmitted. The use of power electronic converters to partially or fully process the power flowing through a line makes these solutions complex and expensive. Other solutions such as thyristor switched series capacitors (TSSCs), phase shifting transformers (PSTs), variable frequency transformers (VFTs) and so-called smart wires (SW) partly or fully eliminate the need for power electronic converters. However, these solutions introduce unwanted system dynamics (TCSC), or generate complex fault modes (PST), or have high maintenance cost (VFT), or add line reactance (SW).

In addition, most conventional implement power flow control for all possible situations. As a result, these solutions are complex and expensive. The problem of power flow control can be segmented in various possible ways. In all situations, three or more power lines are connected at a junction or bus.

How quickly or often a power flow controller should work is one way of segmenting the power flow control problem. Typical power electronics based controllers allow continuous control, although exceptions such as VFT exist. Typically, power flow controllers which offer continuous control are much more expensive. The most prevalent reason for requiring a power flow controller is to prevent line overloading. As long as the line current is less than the line limit, this requirement is met. Hence in principle, a power flow controller should not be needed to control the line current over a continuous range. Thus, only a small subset of applications requires continuous control. Controllers such as phase shifting transformers and TSSCs implement discrete control. Discrete controllers are relatively less expensive and less sophisticated.

SUMMARY

According to an embodiment of a series injection device, the series injection device comprises a power splitter coupled to two or more lines of an AC power system. The power splitter comprises a coupling transformer for each phase of a single phase or polyphase AC circuit that includes the two or more lines. Each of the coupling transformers couples one of the phases of the two or more lines. The power splitter is configured to inject a first voltage of a first polarity into one or more of the two or more lines and inject a second voltage of a second polarity opposite the first polarity into at least one of the two or more lines via the same coupling transformers used to inject the first voltage. The first and the second voltages are controllable, and may or may not be independently variable.

According to an embodiment of a method of controlling power flow in two or more lines of a power system, the method comprises: coupling each phase of a single phase or polyphase AC circuit that includes the two or more lines via a respective coupling transformer; injecting a first voltage of a first polarity into one or more of the two or more lines via the coupling transformers; and injecting a second voltage of a second polarity opposite the first polarity into at least one of the two or more lines via the same coupling transformers used to inject the first voltage, the first and the second voltages being controllable. The first and the second voltages may or may not be independently variable.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide systems and methods for controlling power flow through multiple parallel paths of an AC network without the need of expensive converters or fast switching elements. The embodiments described herein are either fully passive or mostly passive, thus ensuring low cost and high reliability. Power flow control is an issue not only in transmission systems, but also in distribution systems and even low voltage applications. The power flow control techniques described herein can be applied at any voltage and power level, depending on the particular application.

Figure 1:
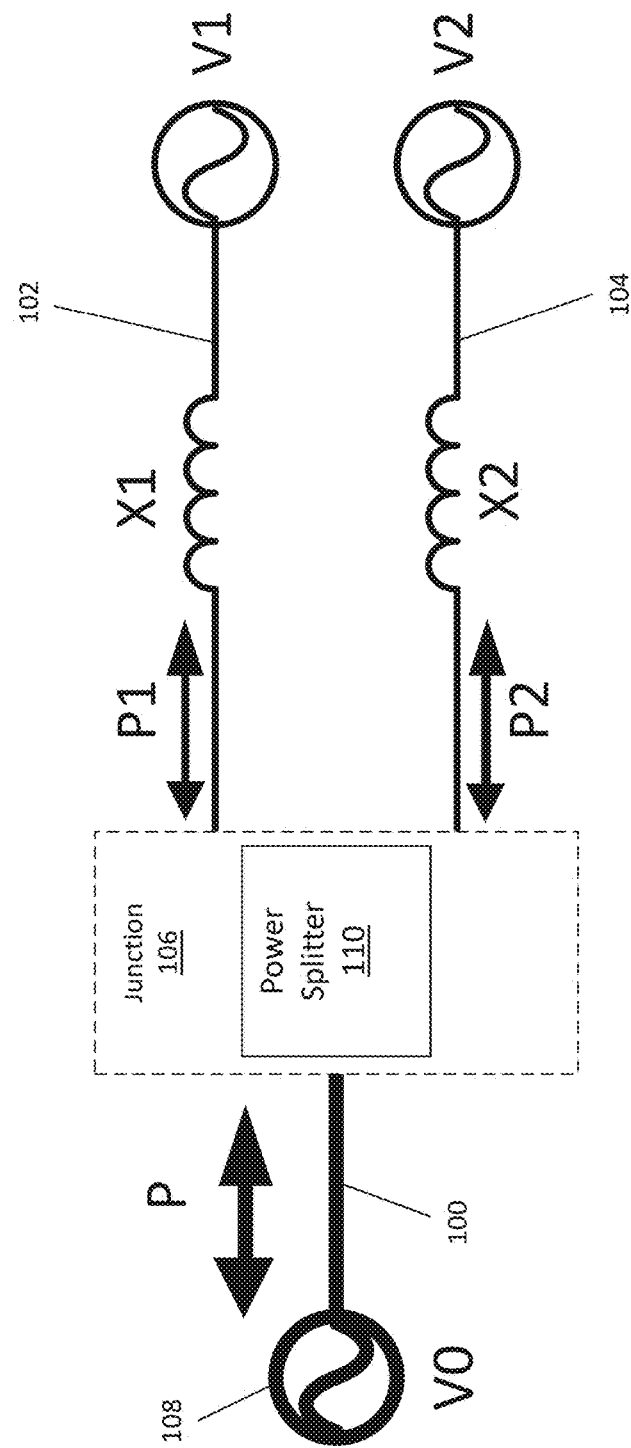
FIG. 1 illustrates a single line block diagram of an embodiment of an AC network which includes a passive or mostly passive power splitter for providing power flow control.

FIG. 1 illustrates an embodiment an AC network such as a mesh network that includes a plurality of AC power lines 100, 102, 104 connected at a junction 106. A first one of the AC power lines 100 provides power flow into the junction 106 from a source 108 upstream of the junction 106. At least a second one and a third one of the AC power lines 102, 104 provide power flow from the junction 106 to downstream of the junction 106 e.g. to loads or other lines (not shown). In one embodiment, the AC power lines 100, 102, 104 are unidirectional lines. In general, the AC power lines 100, 102, 104 can be unidirectional or bidirectional.

Figure 2:
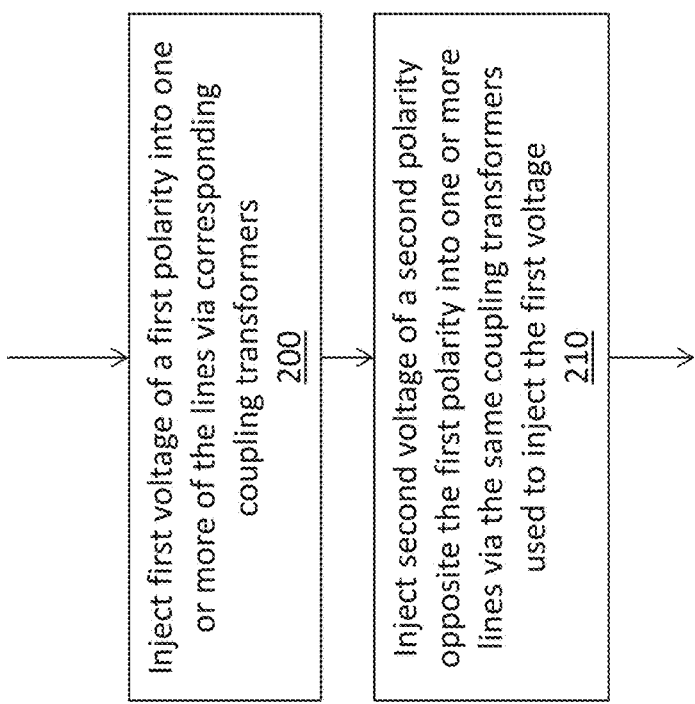
FIG. 2 illustrates a flow diagram of an embodiment of a method of balancing power in an AC network which comprises a plurality of AC power lines connected at a junction.

Operation of the AC network is described next with reference to FIG. 2. A passive or mostly passive power splitter 110 such as a transformer connects the first (upstream, in a power flow sense) AC power line 100 to the second and the third (downstream, in a power flow sense) AC power lines 102, 104 at the junction 106. The power splitter 110 injects a first voltage of a first polarity into one or more of the lines 102, 104 via corresponding coupling transformers of the power splitter 110 (Block 200) and injects a second voltage of a second polarity opposite the first polarity into at least one of the two or more lines 102, 104 via the same coupling transformers used to inject the first voltage (Block 210). The voltages injected by the power splitter 110 are controllable. In some cases, the voltages injected by the power splitter 110 are not independently variable. In other cases, the voltages injected by the power splitter 110 are independently variable.

For ease of explanation, operation of the AC network is described next in even greater detail based on one upstream AC power line 100 feeding power into the junction 106 and two downstream AC power lines 102, 104 drawing power from the junction 106. In general, the embodiments described herein apply to any case in which power flows from a larger capacity AC power line to two or smaller capacity AC power lines.

In general, it can be assumed that the downstream AC power lines 102, 104 do not have the same impedance (X1, X2). Based on this assumption, along with the respective receiving end voltages V1 and V2 of the downstream AC power lines 102, 104, the power flowing through the downstream AC power lines 102, 104 is unequal. For simplicity it can be assumed that the voltages V1 and V2 are similar. This is true in many cases, as the power is sent to the same (or nearby) location via multiple parallel paths. The power splitter 110 is a passive or mostly passive element which maintains the input and output power at a specific ratio. Also, equations (1)-(7) which follow are based on a lossless model for the AC power lines. As a result, purely reactive power is injected by the power splitter 110 according to these equations. In reality, the AC power lines 100, 102, 104 are lossy and therefore will have some resistance. As such, in addition to the reactive power exchange enabled by the power splitter 110, real power exchange also occurs.

Figure 3:
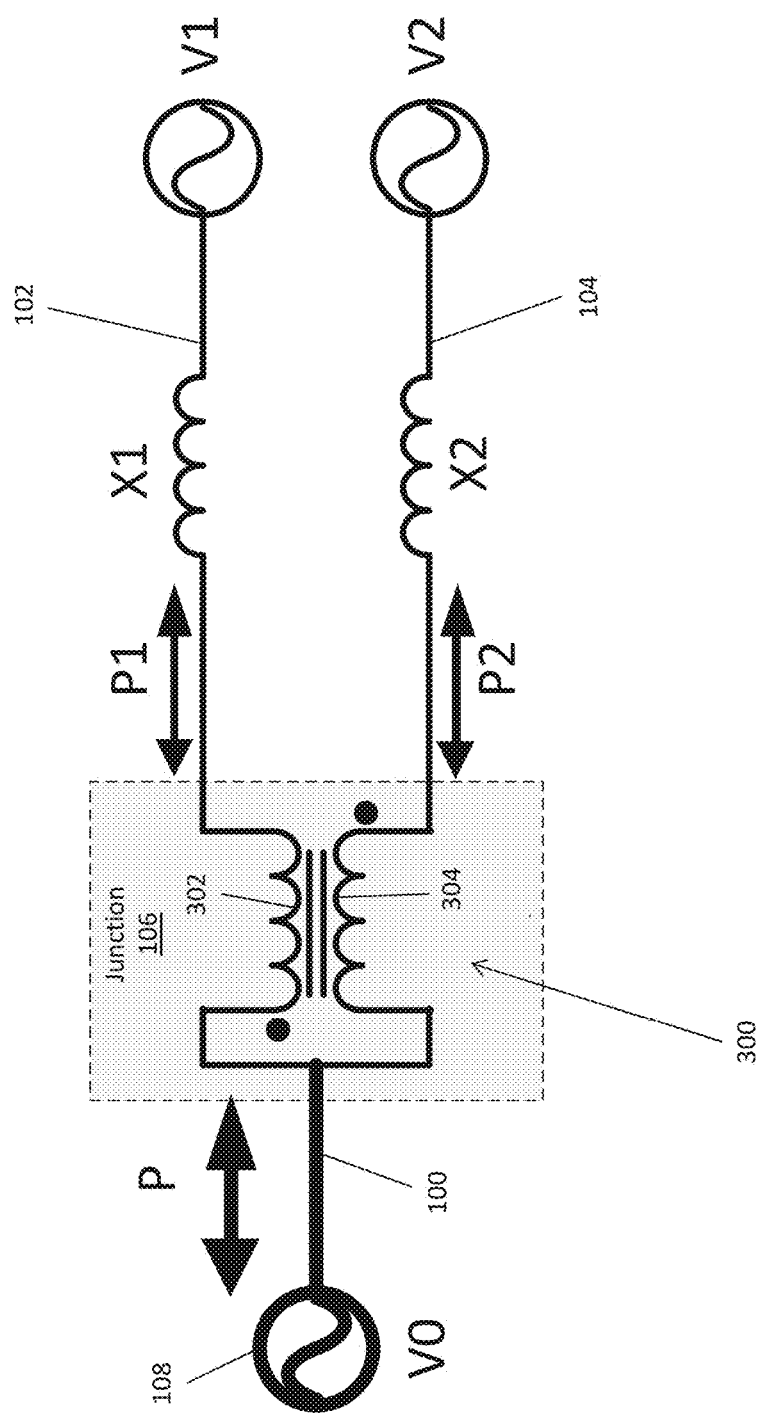
FIG. 3 illustrates a block diagram of an embodiment of an AC network which includes a transformer for providing power flow control.
Figure 4:
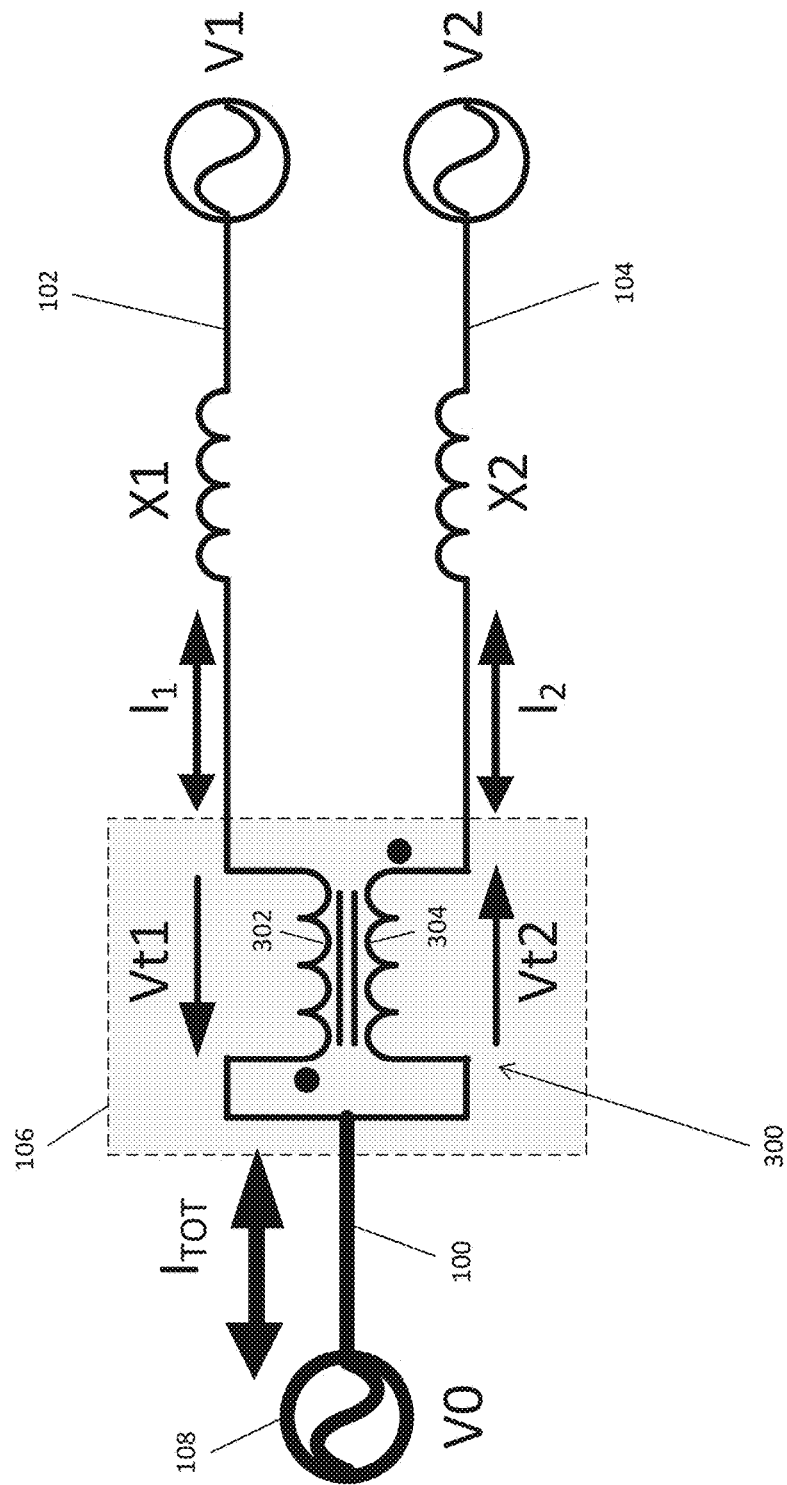
FIG. 4 illustrates the block diagram of FIG. 3 superimposed with voltage and current parameters.

FIG. 3 illustrates a more specific embodiment of the AC network, with the power splitter 110 implemented as transformer 300. The transformer 300 comprises a first winding 302 connecting the upstream AC power line 100 to the first downstream AC power line 102 at the junction 106 and a second winding 304 connecting the upstream AC power line 100 to the second downstream AC power line 104 at the junction 106. The power (P) into the junction 106 is split (P1, P2) between the two downstream AC power lines 102, 104 as shown in FIG. 3. This arrangement yields a passive power splitter which is achieved using a passive transformer 300. The transformer 300 forces the current to be equal between the two downstream AC power lines 102, 104, and splits the incoming power to the downstream AC power lines 102, 104. This is irrespective of the line impedances X1, X2 and the sending and receiving end voltages V1, V2. A more analytical description of this result is explained next with reference to FIG. 4.

The current ($I_{TOT}$) through the upstream AC power line 100 is split according to a 1:N ratio between the two downstream AC power lines 102, 104. The transformer 300 is also chosen to have a turns-ratio of 1:N to achieve the desired power splitting. Under these conditions, the following equations are based on first principles. In the following analysis, the effects of transformer leakage and magnetizing impedance are neglected and do not change the results appreciably.

The voltage $Vt_1$ across the first winding 302 of the transformer 300 can be expressed as a function of the transformer turns-ratio N and the voltage $Vt_2$ across the second winding 304 as given by:

$$Vt_1 = N * Vt_2 \quad (1)$$

The current $I_2$ through the second downstream AC power line 104 can be expressed as a function of the transformer turns-ratio N and the current $I_1$ through the first downstream AC power line 102 as given by:

$$I_1 * N = I_2 \quad (2)$$

The different voltages can be expressed as:

$$V_0 - Vt_1 - V_1 = I_1 * X_1 \quad (3)$$

and $$V_0 + Vt_2 - V_2 = I_2 * X_2 \quad (4)$$

Based on equations (1)-(4), the voltage $Vt_1$ across the first winding 302 of the transformer 300 can be expressed in terms of the voltages and impedances as given by:

$$Vt_1 = \frac{(NX_2 - X_1)V_0 - NX_2 V_1 + X_1 V_2}{NX_2 + X_1/N} \quad (5)$$

For the case of equal power sharing, N=1 and equation (5) reduces to:

$$Vt_1 = \frac{(X_2 - X_1)V_0 - X_2 V_1 + X_1 V_2}{X_2 + X_1} \quad (6)$$

Further for the further case when power is sent to the same receiving bus, V1=V2 and equation (6) reduces to:

$$Vt_1 = \frac{(X_2 - X_1)(V_0 - V_1)}{X_2 + X_1} \quad (7)$$

If the impedance X1/X2 of one downstream AC power line 102/104 is assumed to be twice the impedance X2/X1 of the other downstream AC power line 104/102 (e.g. $X_2=2*X_1$), then $Vt_1=(V_0-V_1)/3$. In cases where the mismatch in impedance is not as high, the value of $Vt_1$ further reduces. For example, a 10% impedance mismatch ($X_2=1.1*X_1$) yields $Vt_1=0.05*(V_0-V_1)$.

Figure 5:
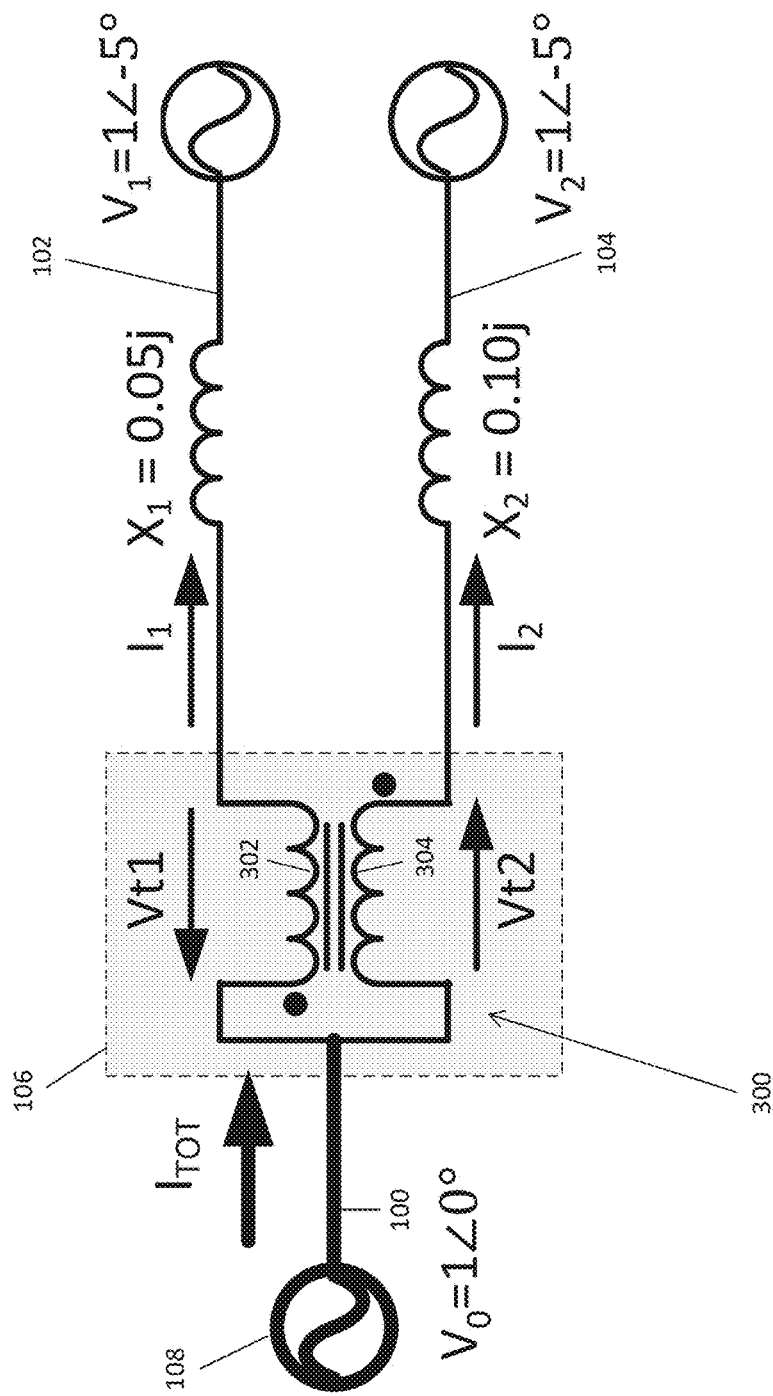
FIG. 5 illustrates the block diagram of FIG. 4 superimposed with simulation parameters.
Figure 6:
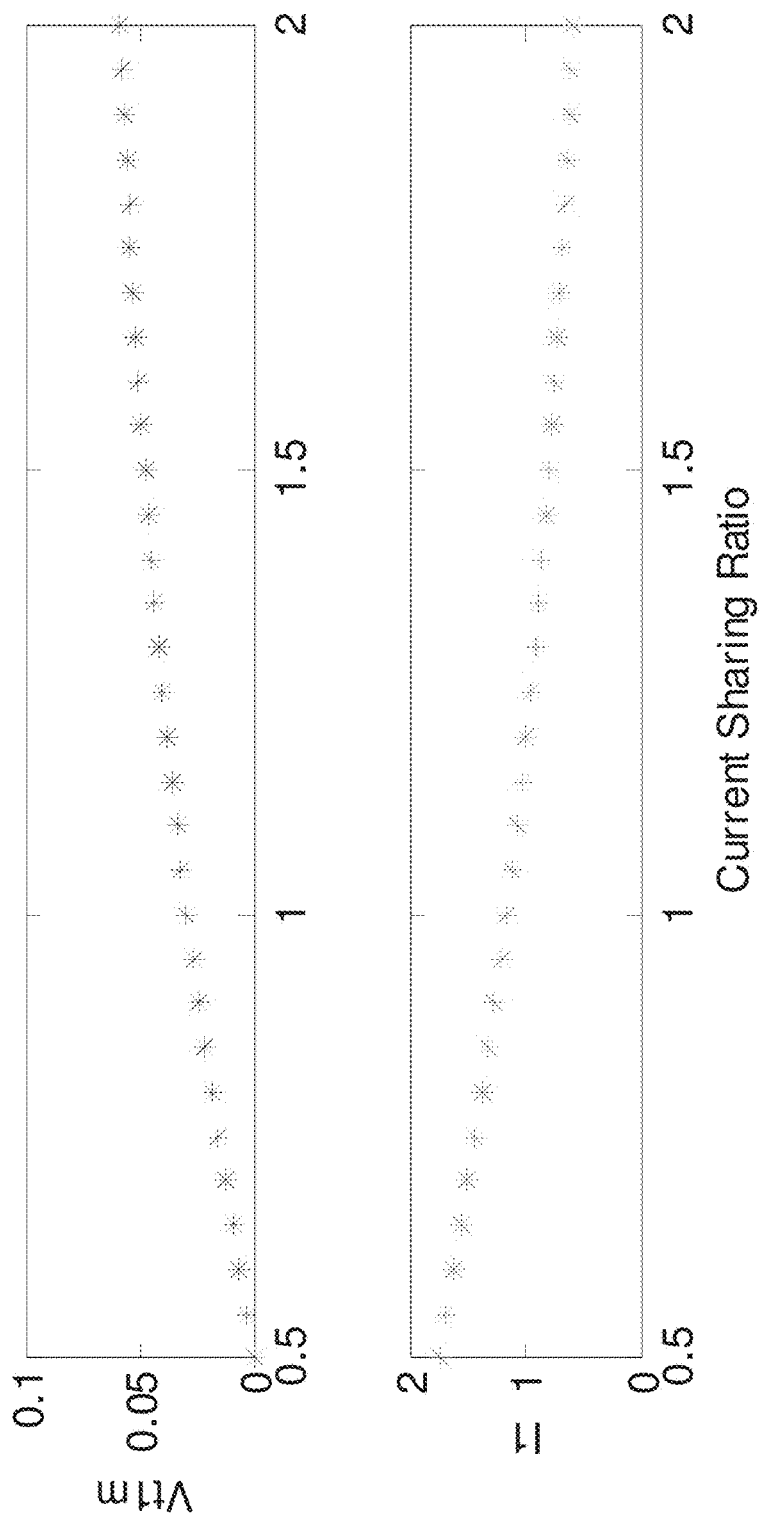
FIG. 6 illustrates plot diagrams which show simulation results based on the simulation parameters included in FIG. 5.

To further illustrate issues such as ratings, an exemplary simulation was performed. The simulation parameters (in per unit) are shown in FIG. 5. The current rating of the transformer 300 is the same as the current rating of the downstream AC power lines 102, 104 in this example. The simulation solves for the terminal voltages $Vt_1$, $Vt_2$ across the transformer terminals. The current sharing ratio ($I_1/I_2$) was varied from 0.5 to 2 as part of the simulation. As such, the current in one downstream AC power line 102/104 was at most twice or half the other line 104/102. The transformer voltage magnitude for this simulation is less than 0.06 pu. For equal current sharing ($I_1/I_2=1$), the voltage across the transformer 300 is only 0.03 pu. FIG. 6 shows the magnitude of voltage ($Vt_1$) across the first winding 302 of the transformer 300 and the corresponding current $I_1$ through the first downstream AC power line 102 for different current sharing ratios.

The embodiments described herein solve the problem of power flow control in an AC network by addressing the problem from a different perspective. Traditional solutions like PST, SW, UPFC, etc. attempt to compensate one line in a network. The root cause of a power flow mismatch between two parallel lines, as shown in FIG. 5, is the mismatch in the voltage drop across the second and third lines 102, 104. This mismatch in voltage drop can be calculated as $\Delta V = I_1*Z_1 - I_2*Z_2$. Neglecting the resistances in the transmission lines 102, 104, this reduces to $\Delta V = I_1*X_1 - I_2*X_2$. Traditional solutions attempt to compensate one of the lines (either the $2^{nd}$ or $3^{rd}$ line) by injecting $\Delta V$ or $-\Delta V$. In other words, the voltage injection required is either inductive or capacitive depending on which line is being compensated.

In most traditional solutions, the voltage is injected using one or more series transformers. The terminal voltage rating of the series transformer (or the cumulative voltage rating in the case of distributed solutions like SW) must be equal to $\Delta V$ for full mismatch compensation. Of course, for economic reasons the entire mismatch may not be compensated. The current rating of the series transformer (or each of the series transformers in case of SW) must be equal to the line current rating. Thus the kVA rating of the compensator (or cumulative rating in case of SW) must be equal to $\Delta V * I_{LINE}$ for full mismatch compensation. The kVA rating is one of the major factors that determine the cost of the injection transformer(s).

The secondary of the injection transformer(s), in the case of traditional solutions, is connected to other devices such as other phases (PST), or converters (UPFC), or inductors (SW). These secondary devices are responsible for generating the amount of reactive power (VAR) that should be injected in the primary.

The embodiments described herein use a concept referred to as Recycling Reactive Power (R2P), whereby the reactive power injected by the primary of an injection transformer is also used for injection somewhere else in the power network using the secondary of the same transformer. For example in FIG. 5, if inductive compensation is injected in the second line 102, an equal amount (in VAR) of capacitive compensation is injected in the third line 104. As a result, there is no 'lost' reactive power.

As a result of this reactive power recycling, the kVA rating of a power splitter is much less compared to that of traditional solutions. For example, in FIG. 5, assuming both the second and third lines 102, 104 have equal line rating (=1 pu) the kVA rating of a PST required for full mismatch compensation is 0.05 pu. For the same system, the kVA rating of a power splitter 110 is 0.25 pu. This indicates a 50% lower kVA rating, which is expected to significantly reduce the cost of the device compared to existing solutions. Depending on the impedance mismatch, system operating point, line ratings, etc. the savings in kVA ratings may be higher or lower.

Figure 7:
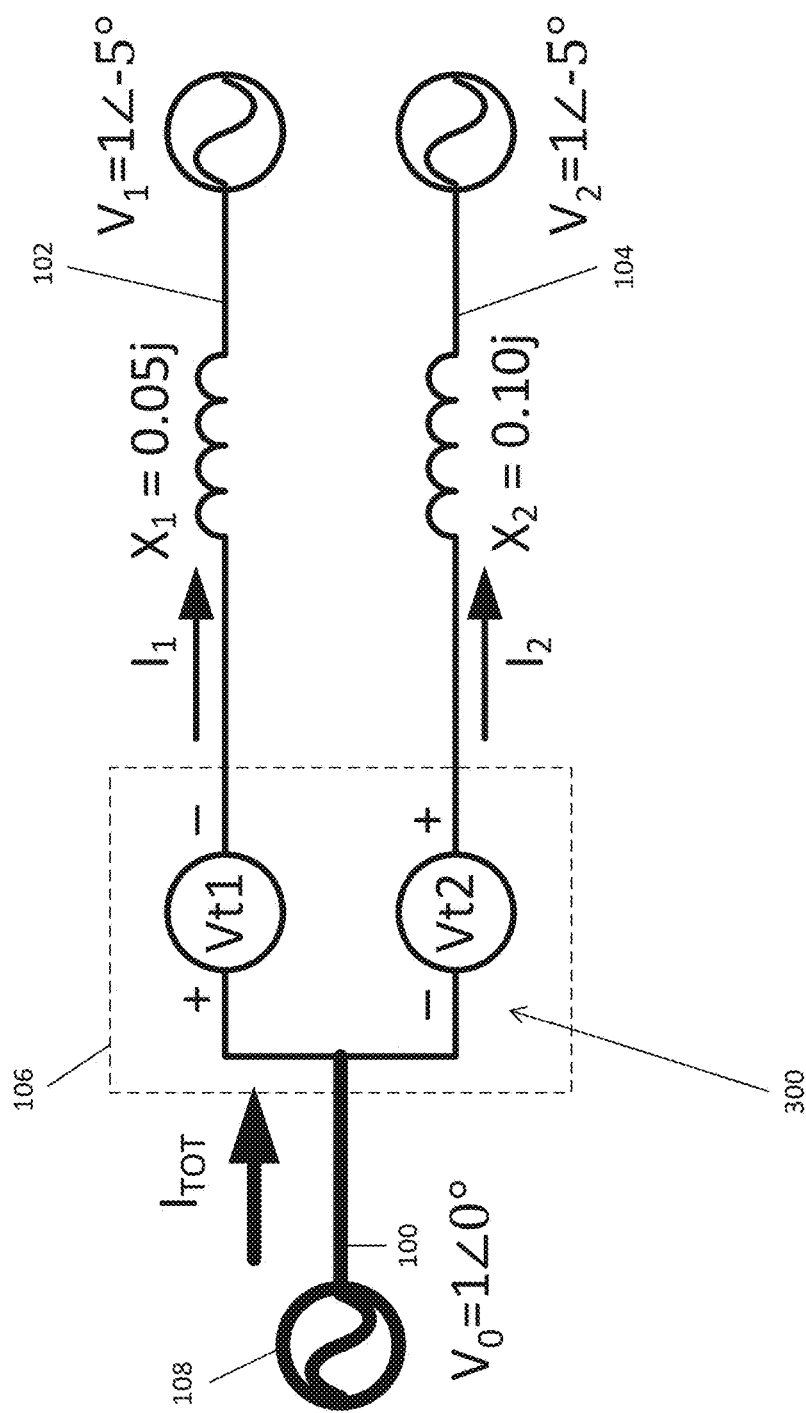
FIG. 7 illustrates an equivalent circuit diagram of the transformer illustrated in FIG. 3, superimposed with voltage and current parameters and simulation parameters.

In any case, the transformer 300 shown in FIG. 5 can be represented by the equivalent circuit diagram shown in FIG. 7. The transformer 300 injects voltages $Vt_1$, $Vt_2$ at the respective downstream AC power lines 102, 104 so as to balance the power flowing through the lines 102, 104. In the case of equal sharing, $Vt_1$ and $Vt_2$ are equal in magnitude. The injection voltages are a small fraction of the total voltage $V_0$, as they correspond to the voltage drop across the respective line impedances $X_1$, $X_2$. Even when the receiving end voltages V1 and V2 of the downstream AC power lines 102, 104 are not equal, the respective injection voltages $Vt_1$ and $Vt_2$ at the opposite end are small. For example if $V_1$ is $1\angle-10°$, $Vt_1$ is less than 0.9 pu for 1:1 power division.

As such, a small fractional rated transformer can be used, without any external control, to ensure proper power sharing between two or more AC power lines in a purely passive manner i.e. without necessarily having to use an active component such as a converter. Although the voltage between the terminals of the transformer 300 is not high, the transformer 300 is connected at the line voltage V0. As such, insulation at line voltage should be used. Also, worst case fault scenarios should be considered for proper transformer design.

In practical scenarios, under various conditions, power sharing between the downstream AC power lines 102, 104 may need to be varied. For example, the power sharing ratio may need to be varied because of a topology change in a distribution network or some other dynamic.

Figure 8:
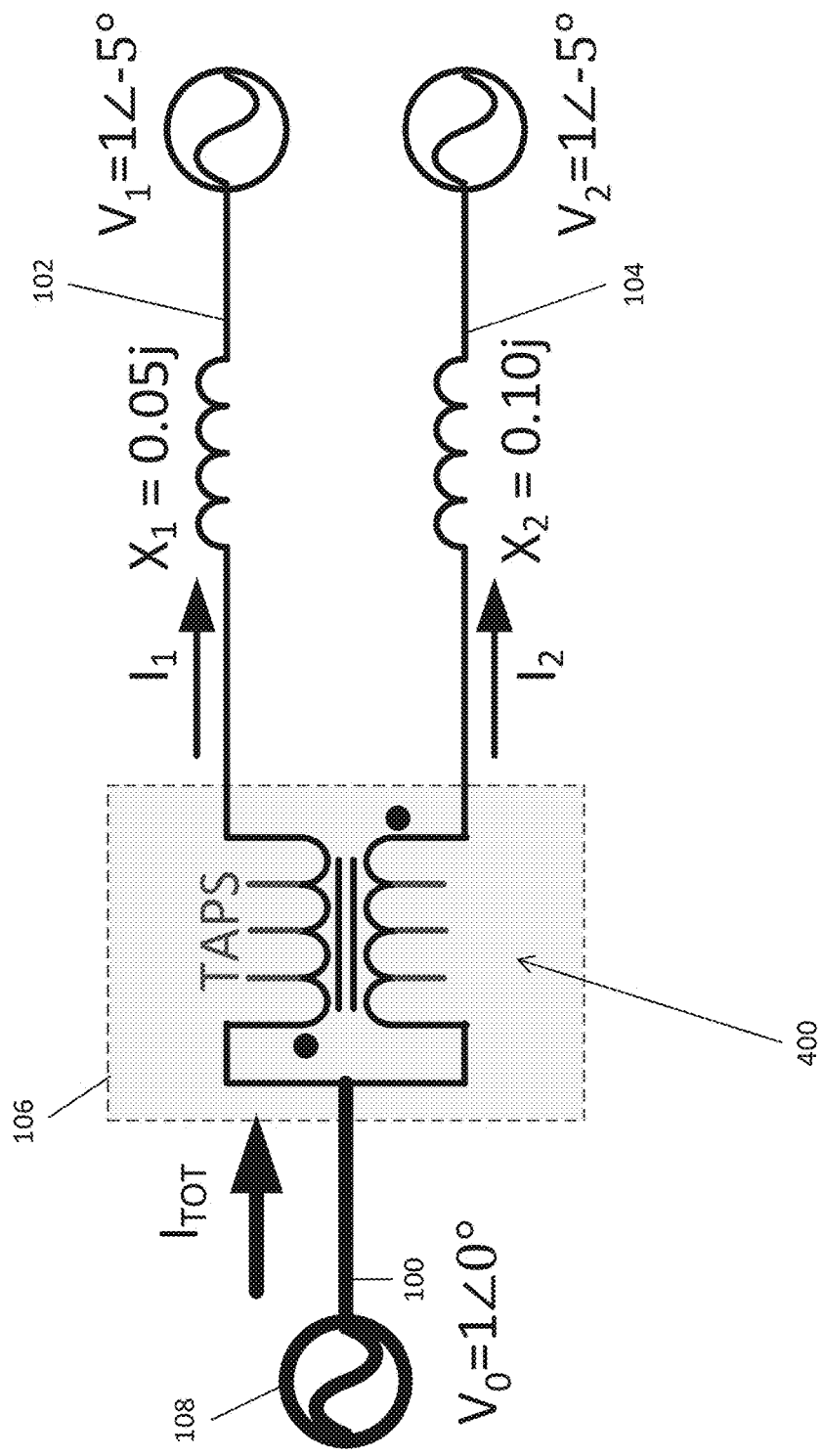
FIG. 8 illustrates a block diagram of an embodiment of an AC network which includes a tap changing transformer for providing power flow control.

FIG. 8 illustrates another embodiment of the AC network. Some level of control for adjusting the power sharing ratio is provided according to this embodiment in order to respond to changing requirements. Particularly, the power splitter 110 is implemented as a tap changing transformer 400 which has a variable turns-ratio and a tap changer mechanism (TAPS) for changing the turns-ratio so as to adjust a power sharing ratio between the downstream AC power lines 102, 104. A tap changer is a connection point selection mechanism along a power transformer winding that allows a variable number of turns to be selected in discrete steps. The tap selection can be made via an automatic or manual tap changer mechanism (TAPS). The tap changing transformer embodiment shown in FIG. 8 can be used in various systems such as an industrial distribution system, where the system topology changes infrequently.

In conventional systems, tap changers in transformers have been implemented using a variety of techniques. The most common technique is using a mechanical selector. Other possible techniques such as using fast power electronic switches have also been reported. In FIG. 8, the tap changing transformer 400 can be implemented by any such methods of tap selection. As such, the tap changing transformer embodiment allows per-phase implementation of a PST without the need of coupling between different phases. In a PST, such a coupling between different phases requires an overhaul of the protection design system and complex fault current analysis.

In cases where smooth and continuous power flow control is needed, a fractional converter can be added to a tertiary winding of the power splitting transformer. This winding assists in controlling the voltage injection in the downstream unidirectional AC power lines.

Figure 9:
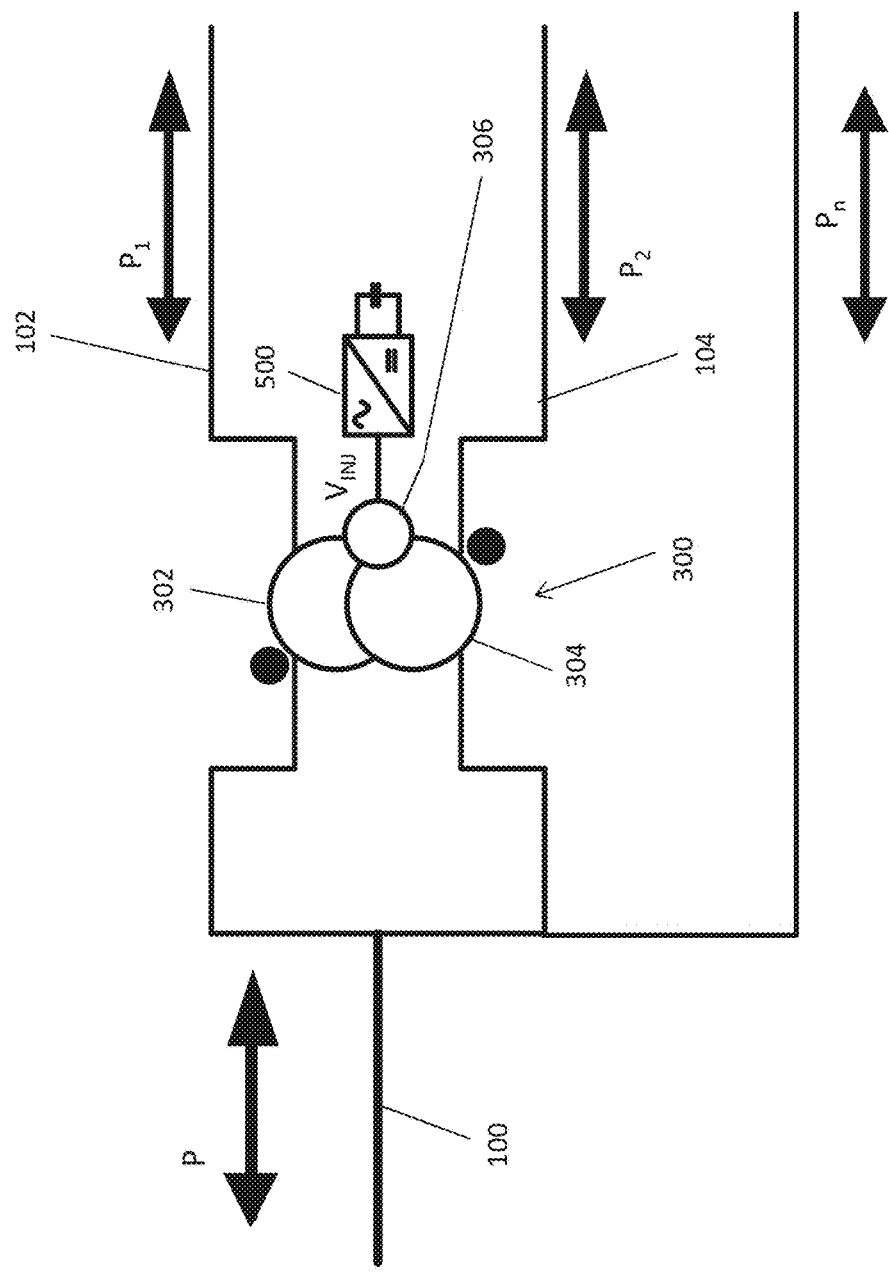
FIG. 9 illustrates a block diagram of an embodiment of an AC network which includes a transformer and a converter coupled to a tertiary winding of the transformer for providing smooth and continuous power flow control.

FIG. 9 illustrates an embodiment of an AC network that implements smooth and continuous power flow control. The transformer 300 has a third winding 306 and a converter 500 is connected to the third winding 306. The converter 500 injects a voltage ($V_{INJ}$) to the third winding 306 which is applied as a positive voltage ($+V_{INJ}$) to one of the downstream AC power lines 102/104 and as a negative voltage ($-V_{INJ}$) to the other downstream AC power line 104/102. For a transformer turns-ratio of 1:1:1, the AC voltage ($V_{INJ}$) injected by the converter 500 is applied as $+V_{INJ}$ in one branch and $-V_{INJ}$ in the other branch. For equal power sharing, $V_{INJ}=(I_1*X_1-I_2*X_2)/2$. This again is a fractional voltage, as it is the difference between the voltage drops across the two line impedances $X_1$, $X_2$. The converter 500 can be further optimized by controlling the turns-ratio of the tertiary winding 306. That is, the third winding 306 can have an adjustable number of turns and the converter 500 can adjust the number of turns of the third winding 306. For example, it may be beneficial to have a lower number of tertiary winding turns in order to use a lower voltage transformer. The converter based topology shown in FIG. 9 functions properly when there are other parallel paths (different from parallel line) in the system.

Figure 10:
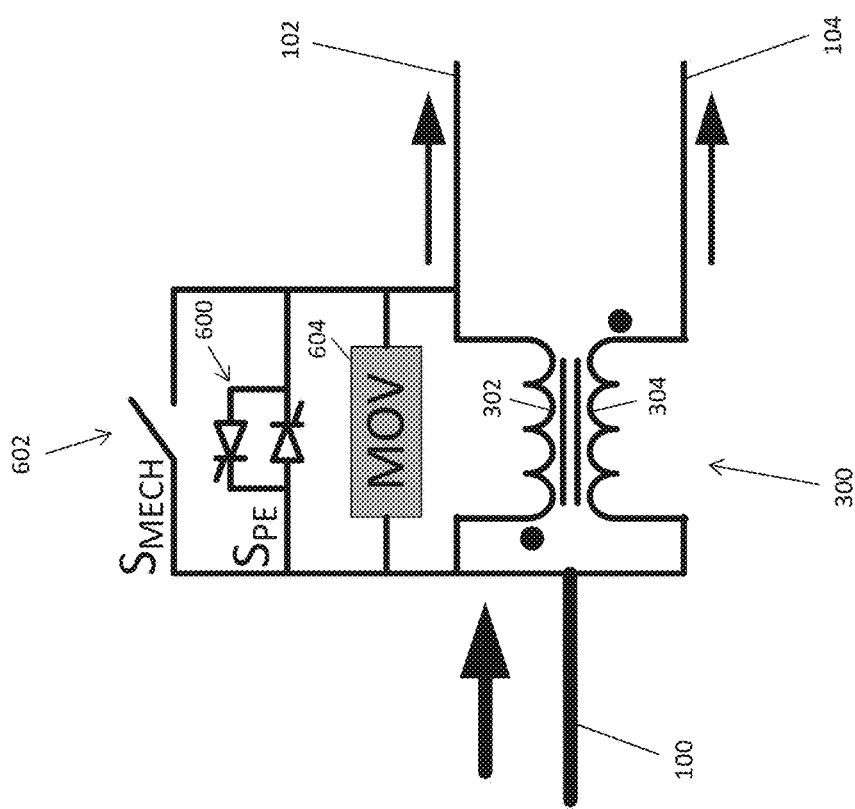
FIG. 10 illustrates a block diagram of an embodiment of an AC network which includes a transformer with a bypass mechanism for providing power flow control.

FIG. 10 illustrates yet another embodiment of the AC network. A bypass mechanism is coupled in parallel to each winding 302, 304 of the transformer 300. The bypass mechanism is shown coupled to only one of the windings 302 for ease of illustration, but can be readily mirrored for the other winding 304. The bypass mechanism is configured to bypass the transformer 300 in response to a bypass event such as a fault condition. The bypass mechanism is subjected to only a small voltage, as the voltage across the transformer 300 is very low. The bypass mechanism can be a hybrid mechanism such as a thyristor arrangement ($S_{PE}$) 600 plus a mechanical bypass device ($S_{MECH}$) 602, or instead just the mechanical bypass device 602. In addition or alternatively, a MOV (metal oxide varistor) arrester 604 can be coupled in parallel to the transformer 300 for providing overvoltage protection.

Figure 11:
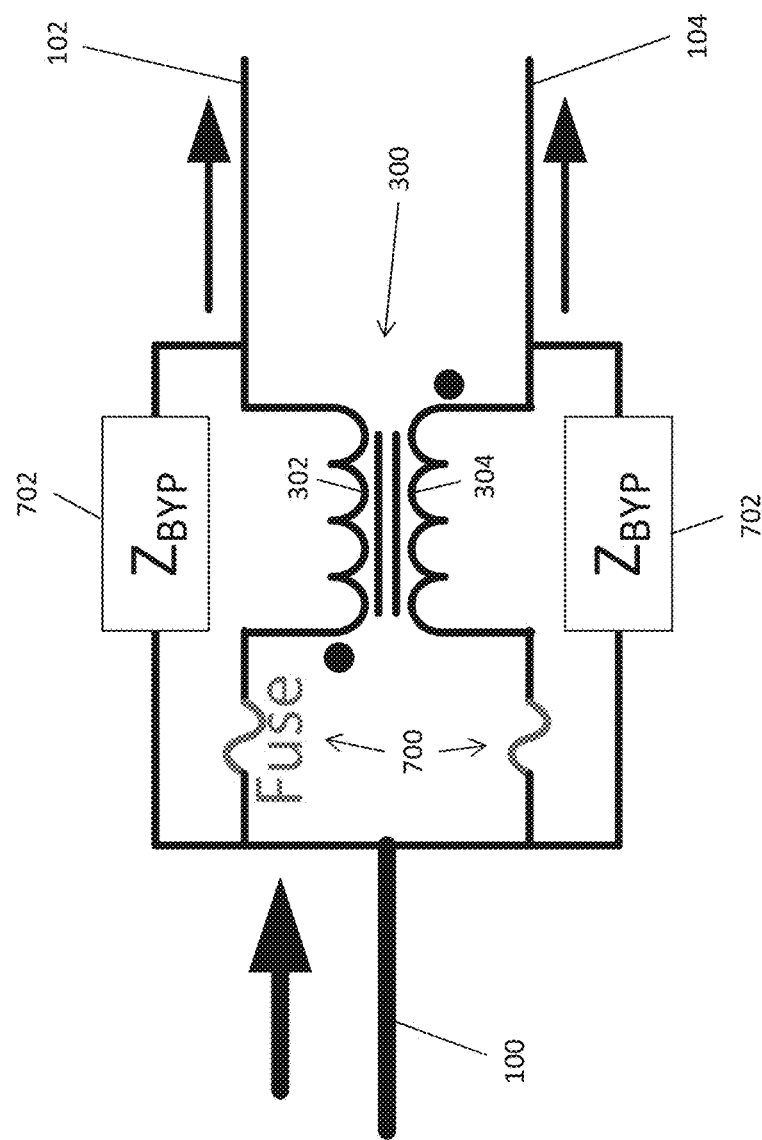
FIG. 11 illustrates a block diagram of an embodiment of an AC network which includes a transformer with a fuse and bypass impedance coupled in series for providing power flow control.

FIG. 11 illustrates still another embodiment of the AC network. A fuse 700 is connected in series between the upstream AC power line 100 and each winding 302, 304 of the transformer 300 to protect the transformer 300 against excessive current (e.g. in the case of low power applications). A bypass impedance ($Z_{BYP}$) 702 can be connected in parallel with each fuse/winding series connection. The bypass impedances 702 enable proper operation even if one of the fuses 700 is blown. If the bypass impedances 702 are chosen to be high, e.g. at least 10 times the leakage inductance of the transformer 300, they do not interfere in normal operation. Alternatively, if high reliability is not needed, the bypass impedances 702 can be omitted. However in this case, the power supplied to the downstream loads (not shown) would be lost in the event of a blown fuse 700.

As previously described herein, the power flow control embodiments described herein can be applied in a variety of different applications.

Figure 12:
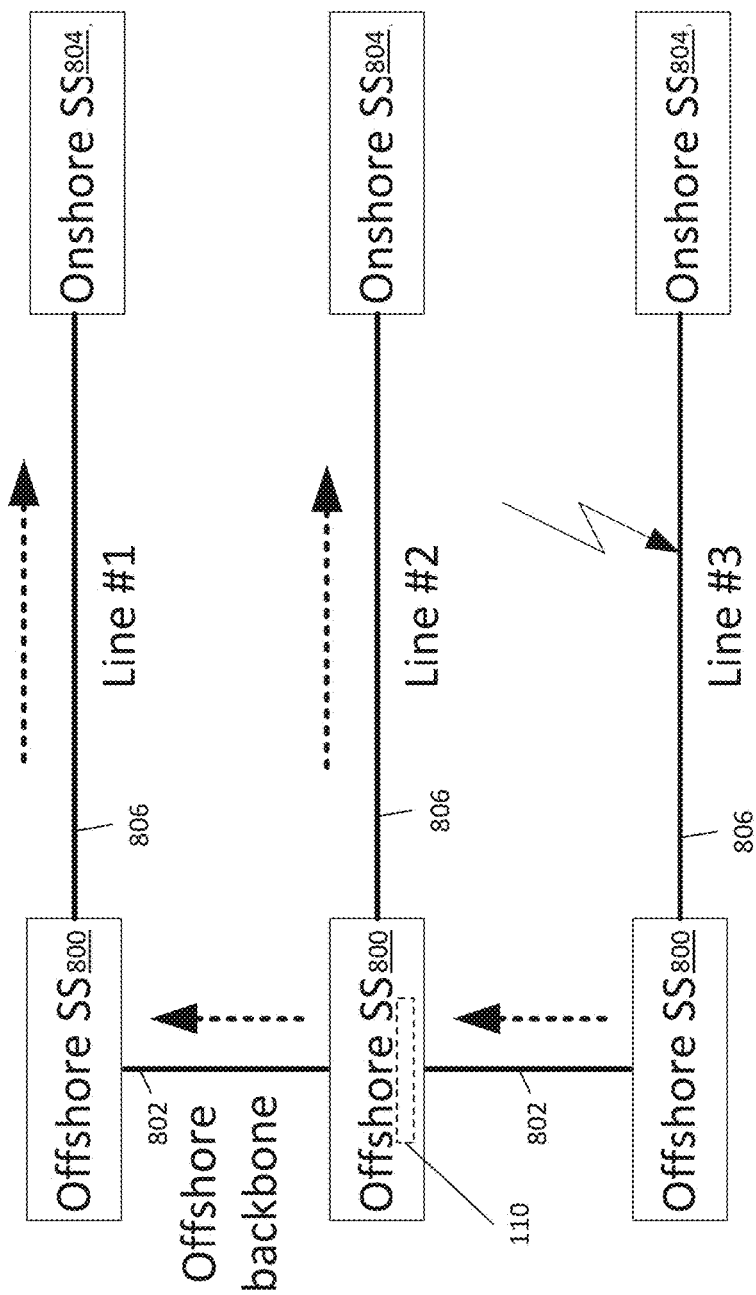
FIG. 12 illustrates a block diagram of an embodiment of a high voltage AC network which includes a passive or mostly passive power splitter for providing power flow control.

FIG. 12 illustrates an embodiment of the power splitter 110 deployed in a high power offshore wind environment. The offshore wind environment includes a plurality of offshore substations 800 connected by offshore power lines 802. Each offshore substation 800 is connected to an onshore substation 804 by a corresponding power line 806. The power splitter 110 is located in one of the off-shore substations 800 and connected to the corresponding power lines 802, 806 as previously described herein. In the case of a fault on the power line 806 labeled "Line #3" in FIG. 12, the power generated by the wind turbines connected to the corresponding offshore substation 800 is re-routed through the power lines 806 labeled "Line #2" and "Line #1" as indicated by the dashed lines in FIG. 12. However, the impedances of the power lines 806 labeled "Line #2" and "Line #1" are different. This would lead to unbalanced loading of the lines 806 and potential overload. However, by inserting the power splitter 110 as described above and operating the power splitter 110 as previously described herein, such overloads are mitigated.

An example of a medium power network is a military microgrid where critical loads are often connected to diesel generators using multiple feeds. For higher reliability considerations, these feeds are routed differently, which results in varying cable length and hence varying loading of the cables. The power splitter 110 can be connected at the junction between an upstream AC power line fed by one or more of the diesel generators and two or more downstream AC power lines which draw power from the junction to supply the critical loads. Such a power flow control arrangement mitigates cable overloading.

Although in various ones of the Figures it is assumed that the source is common for the downstream AC power lines, this need not be the case. For example if two of the same type of uncontrolled loads (e.g. heaters) are required to be balanced, even if they are fed from different sources, the transformer-based power flow control arrangements described herein can ensure equal power consumption at the two loads.

Also, a single line diagram is shown in FIG. 1. Usually power transmission circuits are polyphase, with three phase systems being the most common. In airplane or marine applications, a higher number of phases are common. The embodiments described herein are applicable to both single phase and polyphase power systems. In the case of an M-phase system (where M is the number of phases), M coupling transformers would be used.

Figure 13:
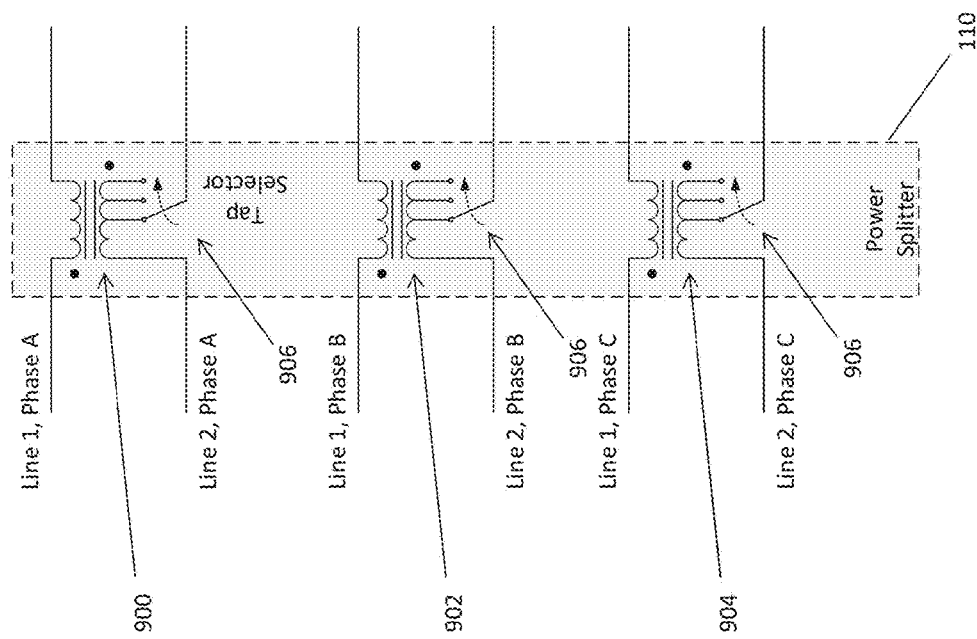
FIG. 13 illustrates a polyphase line block diagram of an embodiment of an AC network which includes a passive or mostly passive power splitter for providing power flow control.

FIG. 13 illustrates a three phase system line block diagram of an embodiment of an AC network which includes a passive or mostly passive power splitter 110 for providing power flow control. In such a three phase system, three coupling transformers 900, 902, 904 are used. Each coupling transformer 900, 902, 904 includes a tap changer mechanism 906 configured to change the turns-ratio so as to adjust the power sharing ratio between two AC power lines (Line 1, Line 2). The first coupling transformer 900 is coupled between the A phases of the two lines. The second coupling transformer 902 is coupled between the B phases of the two lines. The third coupling transformer 904 is coupled between the C phases of the two lines.

Figure 14:
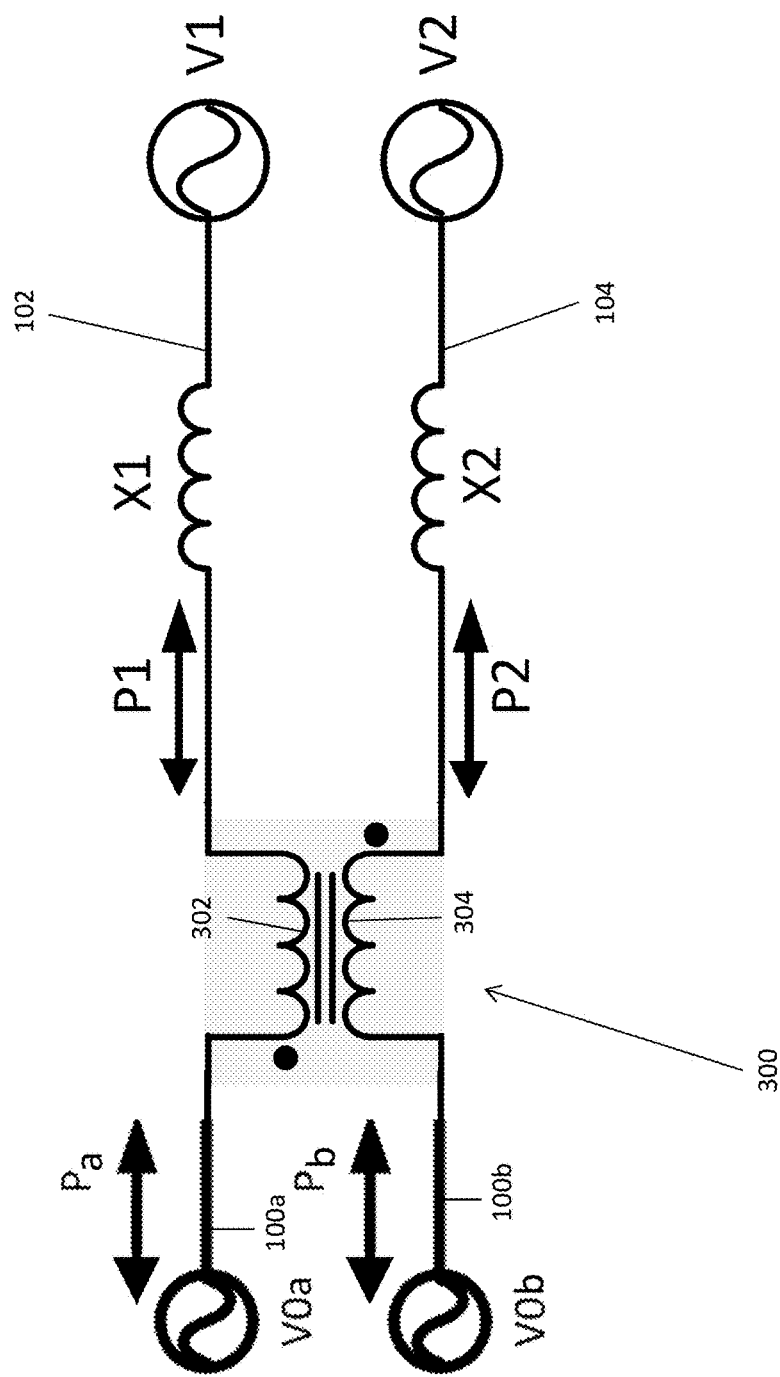
FIG. 14 illustrates a block diagram of another embodiment of an AC network which includes a transformer for providing power flow control.

FIG. 14 illustrates an embodiment of the AC network similar to the embodiment shown in FIG. 3. Different however, the first winding 302 of the coupling transformer 300 connects a first AC power line 100a to a second AC power line 102, and the second winding 304 of the transformer 300 connects a third AC power line 100b to a fourth AC power line 104. As such, each winding 302, 304 of the transformer 300 connects two different power lines 100a/102, 100b/104 to one another. The total power (Pa+Pb) from the first and third lines 100a, 100b is split (P1, P2) between the second and fourth lines 102, 104. This arrangement yields a passive power splitter which is achieved using a passive transformer 300. The transformer 300 forces the current to be equal between the second and fourth lines 102, 104, and splits the incoming power (Pa, Pb) to the second and fourth lines 102, 104. This is irrespective of the line impedances X1, X2 and the sending and receiving end voltages V1, V2.

Terms such as "first", "second", and the like, are used to describe various elements, regions, sections, etc. and are not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A series injection device comprising a power splitter coupled to two or more lines of an AC power system, wherein:
the power splitter comprises a coupling transformer for each phase of a single phase or polyphase AC circuit that includes the two or more lines;
a first one of the coupling transformers comprising a first winding coupled between an AC power source and one line of the two or more lines, and a second winding coupled between the AC power source and a second line of the two or more lines, the first winding and the second winding being magnetically coupled;
the power splitter is configured to inject a first voltage of a first polarity into one or more of the two or more lines and inject a second voltage of a second polarity opposite the first polarity into at least one of the two or more lines via the same coupling transformers used to inject the first voltage; and
a bypass mechanism coupled in parallel to each coupling transformer and configured to bypass that coupling transformer in response to a bypass event;
wherein each bypass mechanism comprises a faster acting power electronic-based switch arrangement and a slower acting mechanical switch arrangement.

2. The series injection device of claim 1, wherein the first and the second voltages are controllable and wherein the first and the second voltages are not independently variable.

3. The series injection device of claim 1, wherein each of the two or more lines has three phases.

4. The series injection device of claim 3, wherein the two or more three phase lines are configured to carry power from a first region to a second region.

5. The series injection device of claim 3, wherein the two or more three phase lines are in parallel and configured to carry power from a first power system bus to a second power system bus.

6. The series injection device of claim 1, wherein the two or more lines are unidirectional AC power lines.

7. The series injection device of claim 1, wherein:
the two or more lines are connected at a junction; and
each of the coupling transformers connects one of the lines to another one of the lines at the junction and is configured to inject a voltage at the junction so as to balance current flowing through the lines.

8. The series injection device of claim 7, wherein the voltages injected by the coupling transformers are equal in magnitude.

9. The series injection device of claim 7, wherein the first winding includes a first end coupled to the junction and the second winding includes a first end coupled to the junction.

10. The series injection device of claim 9, further comprising a converter, wherein the first coupling transformer further comprises a third winding, wherein the converter is connected to the third winding, and wherein the converter is configured to inject a voltage to the third winding which is applied as a positive voltage to one of the first and the second lines and as a negative voltage to the other one of the first and the second lines.

11. The series injection device of claim 9, further comprising a fuse connected in series between the AC power source and each winding of the first coupling transformer.

12. The series injection device of claim 11, further comprising a bypass impedance connected in parallel with each fuse.

13. The series injection device of claim 12, wherein the impedance of each bypass impedance is at least 10 times greater than a leakage impedance of the first coupling transformer.

14. The series injection device of claim 1, wherein each winding of each coupling transformer has the same current rating as the line to which the winding is connected.

15. The series injection device of claim 1, wherein each coupling transformer is free from external control so as to balance the power flowing through the two or more lines in a purely passive manner.

16. The series injection device of claim 1, wherein each coupling transformer has a variable turns-ratio and comprises a tap changer mechanism configured to change the turns-ratio.

17. A method of controlling power flow in two or more lines of a power system, the method comprising:
coupling each phase of a single phase or polyphase AC circuit that includes the two or more lines via a respective coupling transformer;
transmitting power from an AC power source to the two or more lines of the power system via the coupling transformers;
injecting a first voltage of a first polarity into one or more of the two or more lines via the coupling transformers;
injecting a second voltage of a second polarity opposite the first polarity into at least one of the two or more lines via the same coupling transformers used to inject the first voltage, the first and the second voltages being controllable; and providing a bypass mechanism coupled in parallel to each coupling transformer and configured to bypass that coupling transformer in response to a bypass event, the bypass mechanism comprising a faster acting power electronic-based switch arrangement and a slower acting mechanical switch arrangement, wherein the coupling transformer comprises a first winding magnetically coupled to a second winding, wherein a first line of the two or more lines is operatively coupled to the first winding and a second line of the two or more lines is operatively coupled to the second winding.

18. The method of claim 17, wherein the first and second voltages are not independently variable.

19. The method of claim 17, wherein each coupling transformer has an adjustable turns ratio, and wherein the turns ratio of each coupling transformer is adjusted as part of the voltage injection.

20. The method of claim 19, wherein each coupling transformer has a tap changer mechanism for adjusting the turns ratio of that coupling transformer.

21. A series injection device comprising a power splitter coupled to two or more lines of an AC power system, wherein:

the power splitter comprises a coupling transformer for each phase of a single phase or polyphase AC circuit that includes the two or more lines;

a first one of the coupling transformers comprising a first winding coupled between an AC power source and one line of the two or more lines, and a second winding coupled between the AC power source and a second line of the two or more lines, the first winding and the second winding being magnetically coupled;

the power splitter is configured to inject a first voltage of a first polarity into one or more of the two or more lines and inject a second voltage of a second polarity opposite the first polarity into at least one of the two or more lines via the same coupling transformers used to inject the first voltage, a fuse connected in series between the AC power source and each winding of the first coupling transformer; and a bypass impedance connected in parallel with each fuse;

wherein the two or more lines are connected at a junction, each of the coupling transformers connects one of the lines to another one of the lines at the junction and is configured to inject a voltage at the junction so as to balance current flowing through the lines, and the first winding includes a first end coupled to the junction and the second winding includes a first end coupled to the junction.

22. The series injection device of claim 21, wherein the first and the second voltages are controllable and wherein the first and the second voltages are not independently variable.

23. The series injection device of claim 21, wherein each of the two or more lines has three phases.

24. The series injection device of claim 23, wherein the two or more three phase lines are configured to carry power from a first region to a second region.

25. The series injection device of claim 23, wherein the two or more three phase lines are in parallel and configured to carry power from a first power system bus to a second power system bus.

26. The series injection device of claim 21, further comprising a converter, wherein the first coupling transformer further comprises a third winding, wherein the converter is connected to the third winding, and wherein the converter is configured to inject a voltage to the third winding which is applied as a positive voltage to one of the first and the second lines and as a negative voltage to the other one of the first and the second lines.

27. The series injection device of claim 21, wherein at least one of:

the two or more lines are unidirectional AC power lines, the voltages injected by the coupling transformers are equal in magnitude, the impedance of each bypass impedance is at least 10 times greater than a leakage impedance of the first coupling transformer, each winding of each coupling transformer has the same current rating as the line to which the winding is connected, each coupling transformer is free from external control so as to balance the power flowing through the two or more lines in a purely passive manner, and each coupling transformer has a variable turns-ratio and comprises a tap changer mechanism configured to change the turns-ratio.

* * * * *